(12) United States Patent
Rossetto

(10) Patent No.: US 8,899,848 B2
(45) Date of Patent: Dec. 2, 2014

(54) DEVICE AND METHOD FOR SPLICING OPTICAL FIBERS, AND USE OF AN END PIECE IN A DEVICE FOR SPLICING

(75) Inventor: Aaron Rossetto, Gordola (CH)

(73) Assignee: Diamond SA, Losone (CH)

( * ) Notice: Subject to any disclaimer, the term of this patent is extended or adjusted under 35 U.S.C. 154(b) by 287 days.

(21) Appl. No.: 13/256,538

(22) PCT Filed: Mar. 11, 2010

(86) PCT No.: PCT/EP2010/053071
§ 371 (c)(1),
(2), (4) Date: Sep. 14, 2011

(87) PCT Pub. No.: WO2010/105959
PCT Pub. Date: Sep. 23, 2010

(65) Prior Publication Data
US 2012/0002929 A1    Jan. 5, 2012

(30) Foreign Application Priority Data
Mar. 20, 2009   (CH) .......................................... 432/09

(51) Int. Cl.
*G02B 6/255* (2006.01)
*G02B 6/44* (2006.01)
*G02B 6/46* (2006.01)
*G02B 6/38* (2006.01)

(52) U.S. Cl.
CPC ............ *G02B 6/2553* (2013.01); *G02B 6/4452* (2013.01); *G02B 6/4454* (2013.01); *G02B 6/46* (2013.01); *G02B 6/2551* (2013.01); *G02B 6/3846* (2013.01)
USPC .............................................. 385/97; 385/95

(58) Field of Classification Search
CPC ....... G02B 6/46; G02B 6/4454; G02B 6/4452
USPC ..................................................... 385/95–99
See application file for complete search history.

(56) References Cited

U.S. PATENT DOCUMENTS 4,274,707 A * 6/1981 Pacey et al. .................... 385/139
(Continued)

FOREIGN PATENT DOCUMENTS

DE    20 2007 009 480 U1   10/2007
DE    10 2006 036 330 A1    2/2008
(Continued)

*Primary Examiner* — Charlie Peng
*Assistant Examiner* — Mary El Shammaa
(74) *Attorney, Agent, or Firm* — Nath, Goldberg & Meyer; Jerald L. Meyer; Leonid D. Thenor

(57) ABSTRACT

The invention relates to a device for splicing fiber optic lines having a first and second holder for direct or indirect receiving of at least one fiber optic line each, an alignment means for aligning the ends of the fiber optic lines received in the first and in the second holder to one another and electrodes in the region of the ends of the fiber optic lines aligned to one another for creating a slice connection. The two holders on one side and the alignment means and preferably the electrodes on the other side can move relative to one another between a splicing position and a release position such that the splice connection is released in the release position.

20 Claims, 7 Drawing Sheets

(56) References Cited

U.S. PATENT DOCUMENTS

| | | | |
|---|---|---|---|
| 4,687,287 A * | 8/1987 | Lukas et al. | 385/134 |
| 5,481,640 A * | 1/1996 | Harman et al. | 385/147 |
| 5,961,865 A * | 10/1999 | Esmaeili et al. | 219/383 |
| 7,438,485 B2 * | 10/2008 | Tabata et al. | 385/97 |
| 2005/0175291 A1 | 8/2005 | De Marchi | |
| 2005/0201692 A1 | 9/2005 | De Marchi | |
| 2005/0276549 A1 * | 12/2005 | Tabata et al. | 385/96 |
| 2008/0181563 A1 | 7/2008 | Akiyama | |
| 2009/0238523 A1 | 9/2009 | Honma et al. | |

FOREIGN PATENT DOCUMENTS

| | | |
|---|---|---|
| JP | 62-223708 A | 10/1987 |
| JP | 2002-543451 A | 12/2002 |
| JP | 2005-531020 A | 10/2005 |
| JP | 2005-531045 A | 10/2005 |
| JP | 2005-326457 A | 11/2005 |
| WO | 00/65388 A1 | 11/2000 |
| WO | 04/001471 A1 | 12/2003 |
| WO | 2008/030432 A2 | 3/2008 |
| WO | 2008/059843 A1 | 5/2008 |

* cited by examiner

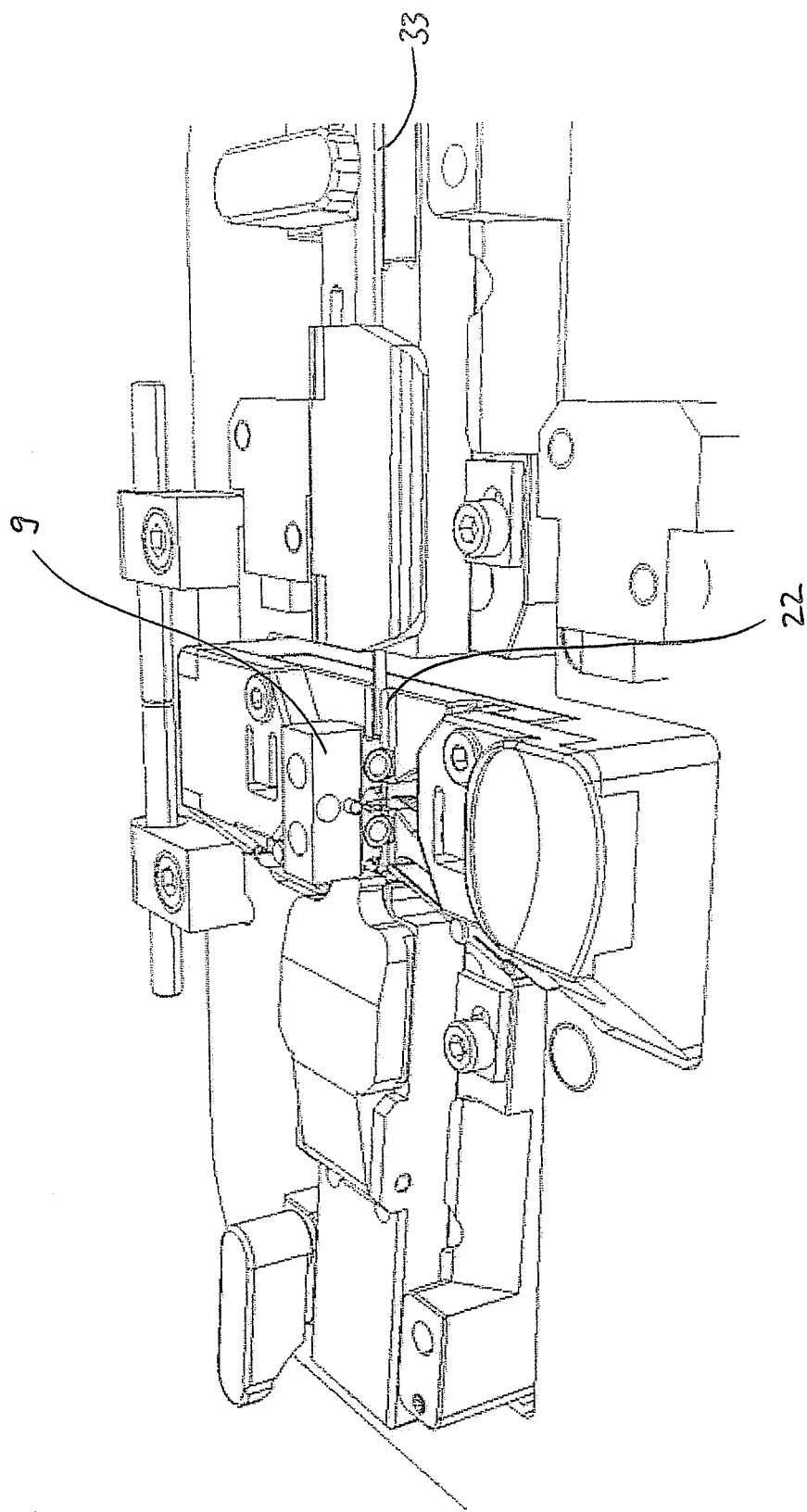

DEVICE AND METHOD FOR SPLICING OPTICAL FIBERS, AND USE OF AN END PIECE IN A DEVICE FOR SPLICING

This is a National Phase Application filed under 35 U.S.C. §371 as a national stage of International Application No. PCT/EP2010/053071, filed on Mar. 11, 2010, claiming the benefit from Swiss Patent Application 00432/09, filed on Mar. 20, 2009, the content of each of which is hereby incorporated by reference in its entirety.

BACKGROUND

The present invention relates to a device and a method for splicing optical fibers, and to the use of an end piece in a device for splicing.

Numerous devices for splicing optical fibers are already known and widely used. A common feature of all these devices is that, after the splicing, the spliced connection must be removed from the device and, in an additional step, this spliced connection must be provided with a mechanical protective device. Since the optical fiber ends that are to be spliced must be free of any outer sheath and any protective sleeve before the splicing, the optical fiber ends thus exposed, and in particular the spliced connection, are fragile and very sensitive to improper handling.

For example, DE 10 2006 036 330 A1 shows a portable splicing unit with holding devices for receiving two pieces of optical fiber to be spliced to one another. After the splicing, the pieces of optical fiber are removed from the holding devices and fed to a shrinking oven by means of a pivotable bracket.

WO 2004/001471 A1 discloses a method for splicing two optical fiber ends, the one optical fiber end being preassembled in a plug-in connector part. In this case, a pin holder of the connector part and a cable end are clamped in such a way that the two optical fiber ends lie coaxially with respect to one another on a centering block. After the splicing, the pin holder and the cable end are removed from the centering block in the clamped state, in particular are raised. Subsequently, a mechanical protection is applied to the splice. The disadvantage of this method is that the unprotected splice has to be moved, which can easily lead to the splice being damaged.

BRIEF SUMMARY

It is therefore an object of the invention to provide a device and a method which make it possible for a mechanical protection to be applied to the spliced connection after the splicing without separate handling of the spliced optical fibers. This object is achieved by the device and the method with the features of claims 1 and 11.

A device according to the invention for splicing optical fibers has a first and a second holder for directly or indirectly receiving at least one optical fiber each. Thus, it is conceivable, for example, that the optical fiber is clamped in an intermediate piece and the intermediate piece is received in the holder. Such an intermediate piece may be, for example, a connector or a connector part. Alternatively, it is also conceivable that the intermediate piece consists of a sheath of a fiber-optic cable. The device also has an aligning means, which serves for the precise alignment of the ends of the optical fibers received in the holders. Such an aligning means may, for example, have a V-shaped groove. Furthermore, the device has electrodes, which are located in the region of the mutually aligned ends of the optical fibers. To create the spliced connection, the electrodes are connected to a high-voltage source, so that an arc is produced between the electrodes. The two holders on the one hand and the aligning means, and preferably the electrodes, on the other hand are movable in relation to one another, between a splicing position and a releasing position, in such a way that, in the releasing position, the spliced connection is released and is consequently freely accessible for further processing steps. It is irrelevant in this respect whether the two holders move simultaneously away from the electrodes and the aligning means, or whether the electrodes and the aligning means move away from the two holders. Furthermore, it is also conceivable that the aligning means can be moved away from the two holders in one direction and the electrodes can be moved away in other directions. Apart from movement in a straight line, which may take place in any of the three axes, swiveling movements about a fixed axis or even combinations thereof are also conceivable.

In the releasing position, the spliced connection is released, and accessible, with respect to the longitudinal axis of the optical fibers over an angle of almost 360°. As will be evident, this allows protective sleeves or the like to be applied as long as the optical fibers are still firmly clamped. An inspection of the spliced connection before removal from the device is also made much easier.

The aligning means and the electrodes are, for example, advantageously arranged on a splicing module mounted between the holders. By moving this splicing module away from the relatively fixed holders, the aligning means and the electrodes are consequently moved simultaneously. Preferably, the splicing module is thereby lowered. Combinations of movements, such as lowering and displacing or swiveling and displacing, are likewise possible. Other combinations of movements are not ruled out. The relatively fixed holders have the advantage that clamped fiber-optic cables do not have to be moved. It is also advantageous for reasons of stability of the unit that the splicing module is pressed downward, that is to say against the underlying surface.

The splicing module is preferably moved from the splicing position into the releasing position against a prestressing force. Furthermore, it is advantageous if the splicing module can be arrested in the releasing position. For this purpose, the splicing module may, for example, be prestressed in the splicing position by a spring and be arrested in the releasing position by a simple snapping function. Alternatively, a combination of a spring and a shock absorber may be used, the shock absorber being designed such that the shock absorber valve is closed in the releasing position. Not only a hydraulic shock absorber but also a pneumatic shock absorber or a mechanical shock absorber may be used. It has proven to be advantageous if an arresting device which automatically releases the arrestment when there is pressure against the prestressing force is used for arresting in the releasing position. Apart from the known ballpoint pen mechanism, a person skilled in the art is familiar with other solutions. With the aid of this arrangement, the splicing module can be moved back again immediately into the splicing position. It goes without saying that motorized displacement of the components would also be possible.

The holders for receiving the optical fibers may each be arranged on a carrier unit and releasably connected to it. A screw connection, for example, represents such a releasable connection. Alternative solutions, for example combinations of positioning pins, magnetic connections and securing levers, are likewise conceivable and known to a person skilled in the art. Thus, the holders can be quickly exchanged if the device is to be converted for other optical fibers.

The carrier units may lie on planes which can be tilted in relation to one another. This allows an angled position between the optical fibers. This angled position makes it easier to align the ends of the optical fibers by means of the aligning means.

The carrier units are in this case mounted on a horizontal spindle, which is perpendicular to the axes of the optical fibers to be received in the holders. It has been found in this respect that an angle between the axes of the optical fibers to be spliced of between 170° and 180°, in particular between 174° and 178°, is advantageous.

To reach the releasing position, the carrier units may be in operative connection with the movement mechanism in such a way that the carrier units tilt as they move from the releasing position into the splicing position. This operative connection has the effect of ensuring said angled position automatically without any influence being brought to bear by the user.

One of the two holders may have a recess in which an end piece can be received with an exact fit. An exact fit is understood here as meaning that the end piece is received and fixed in the holder without any play, but without completely enclosing the end piece. This end piece contains an optical fiber, which is preferably prefabricated. Thus, for example, a plug-in connector part with a prefabricated optical fiber stub may be received by the recess. In this case, this plug-in connector part and the optical fiber are prepared in such a way that one end of the optical fiber comes to lie in the region of the electrodes.

In a method according to the invention for splicing optical fibers by a device for splicing, optical fibers are placed directly or indirectly into a first and a second holder of the device. Furthermore, the ends of the optical fibers placed in the holders are aligned with one another in an aligning means. By producing an arc between two electrodes, a spliced connection is obtained by splicing the ends of the optical fibers. After the splicing, the spliced connection is released between a splicing position and a releasing position by a relative movement of the two holders on the one hand and the aligning means, and preferably the electrodes, on the other hand. Now a mechanical protection can be applied to the spliced connection. As the final step, the optical fibers are removed from the holders of the device. The fact that the spliced connection is released and provided with a mechanical protection after the splicing means that it can be removed from the device without any risk of the spliced connection or the optical fiber being damaged by improper handling.

It has proven to be advantageous that, before and during the application of the mechanical protection, the optical fibers are subjected to a predefined tensile stress. This can ensure that the optical fibers, and in particular also the spliced connection, are enclosed optimally, in particular in the stretched state, by the mechanical protection.

For releasing the spliced connection after the splicing, the aligning means, and preferably the electrodes, may be lowered. However, it is also conceivable that only the aligning means are lowered, and the electrodes are laterally displaced.

It goes without saying that other combinations of movements are also conceivable.

In an aforementioned device for splicing optical fibers there may be used, in particular, an end piece that has an optical fiber which is prefabricated in the end piece and accessible on one side of the end piece, as well as sheath parts which can be connected to the end piece or are connected thereto by way of a joint. In this case, the sheath parts are closed around the spliced connection and connected to one another in the releasing position after the splicing.

Further individual features and advantages of the invention emerge from the description which follows of an exemplary embodiment and from the drawings, in which:

BRIEF DESCRIPTION OF THE DRAWINGS

FIG. 10 shows an enlarged view of the working region of the device according to FIG. 1, the fiber holding-down means of the protective cover being shown separately.

DETAILED DESCRIPTION

Figure 1:
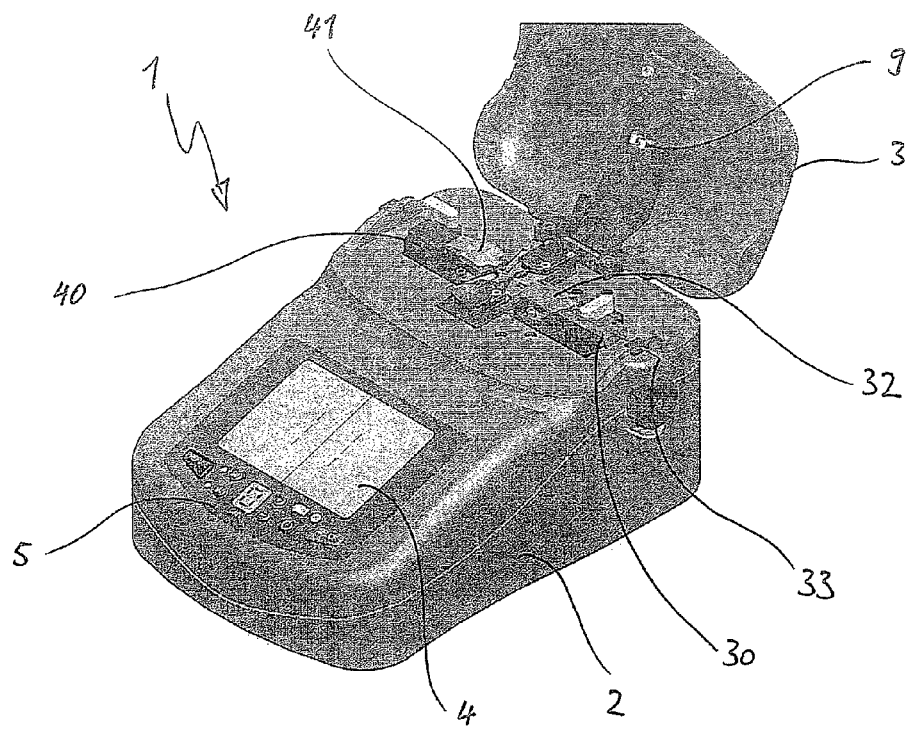
FIG. 1 shows a perspective view of a device according to the invention with an open protective cover.

FIG. 1 shows a view of a device 1 according to the invention with a housing 2 and an open protective cover 3. Attached to the housing 2 on the front side is a display 4 and an operating unit 5. Two holders 30, 40 can be seen in the working region. The holder 40 is configured such that it receives a prefabricated end piece and fixes it by means of the closure flap 41. The holder 30 is designed for receiving an optical fiber, which is fixed by the closure flap 32. A fiber holding-down means 9, which presses the fibers into corresponding aligning means 22 (see FIG. 8) between the holders (30, 40) during the splicing operation, can also be seen in the protective cover 3.

Figure 2:
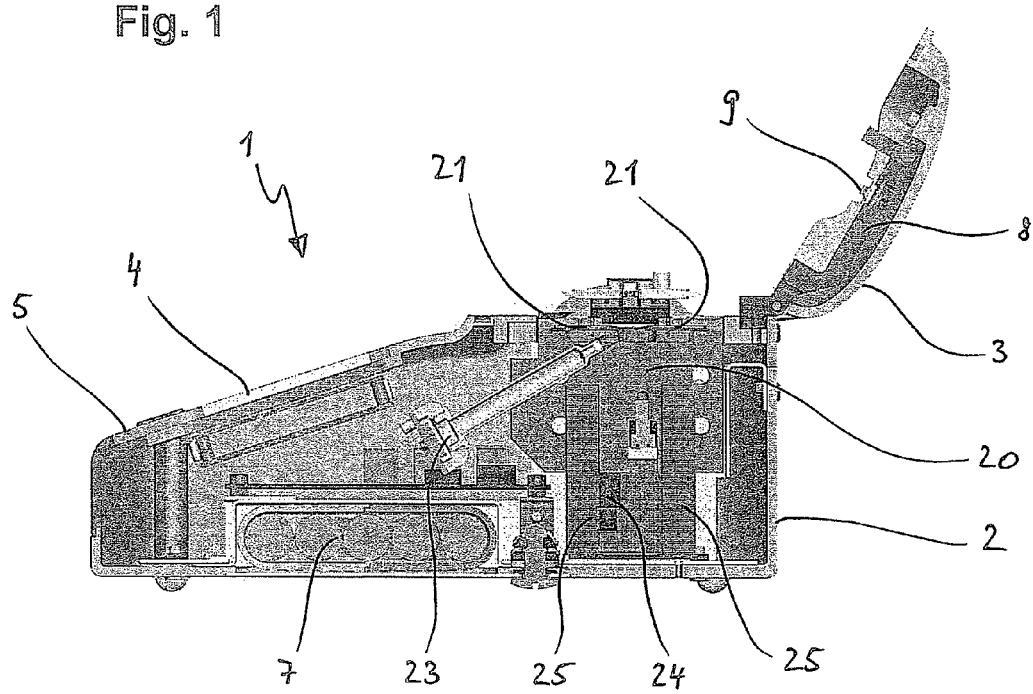
FIG. 2 shows a section through the device according to FIG. 1 along the axis of the electrodes.

In FIG. 2, a section through the device 1 according to FIG. 1 along the axis of the electrodes 21 is shown. Arranged inside the housing 2 is a camera 23, which shows the precise alignment of the optical fibers to be spliced on the display 4. A splicing module 20 comprises the aligning means 22 and the electrodes 21 for splicing. The splicing module 20 is also provided with a linear guide 26 (see FIG. 4), two arresting devices 25 and a shock absorber 24. The linear guide allows lowering of the splicing module 20, so that, after the splicing operation, the optical fibers and the spliced connection can be released. The shock absorber 24 with its retarding function prevents abrupt lowering of the splicing module 20. The arresting devices 25 serve on the one hand for arrestment in the releasing position and on the other hand, by means of a built-in spring element, serve for the automatic displacement into the splicing position after the release of the arrestment. A battery unit 7 serves for supplying power to the camera 23, the display 4, a high-voltage generator 6 (see FIG. 3), a lighting means 8 integrated in the protective cover 3 and electronics for the control and evaluation. The splicing operation may be initiated by pressing the corresponding buttons in the operating unit 5. The fiber holding-down means 9, which fixes the optical fibers on the aligning means during the splicing, can be seen in the protective cover 3.

Figure 3:
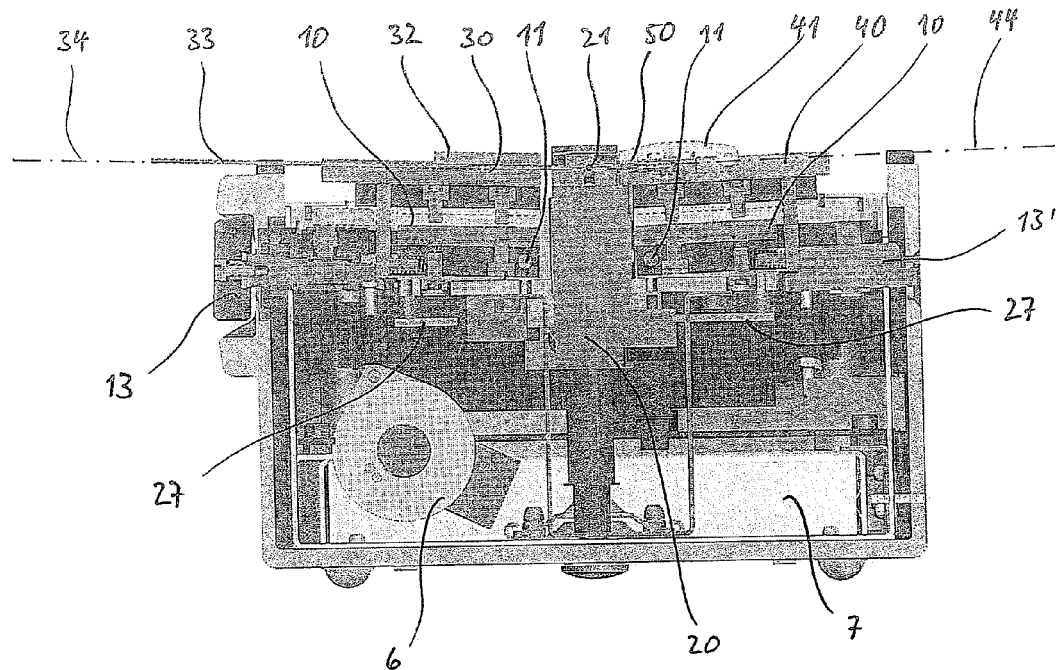
FIG. 3 shows a section through the device according to FIG. 1 along the axes of the optical fibers, the device being shown in the splicing position.

FIG. 3 shows a section through the device 1 according to FIG. 1 along the axes 34 and 44 of the optical fibers. The device 1 is shown with the splicing module 20 in the splicing position, i.e. the splicing module 20 is aligned such that an axis through the electrodes 21 intersects the axes 34 and 44 of the optical fibers. The optical fibers are received on both sides of the electrodes 21 by holders 30, 40.

The holder 30 is in this case designed such that it can receive an optical fiber 33 directly and fix it on the holder 30 by closing of the closure flap 32. The holder 40 is designed such that it can receive a prefabricated end piece 50 and fixes this end piece 50 by closing of the closure flap 41. The two holders 30, 40 are each arranged on a carrier unit 10 and releasably connected to it. In this case, the two carrier units 10 are mounted such that they can tilt on a horizontal spindle 11. The carrier units 10 are operatively connected to the splicing module 20 by side pins 27 such that a movement of the splicing module 20 from the releasing position into the splicing position brings about tilting of the two carrier units 10. This tilting of the carrier units 10 has the effect that the optical fibers to be spliced are brought together at an angle. In this case, the angle between the axes 34, 44 of the optical fibers to be spliced is 170° to 180°, preferably 174° to 178°. A fine adjusting means 13, 13' serves for bringing each of the optical fibers precisely together. With these fine adjusting means 13, 13', the ends of the optical fibers 33, 52 can be brought together exactly by displacement of the position of the carrier units 10, and consequently of the holders 30, 40 and of the optical fibers 33, 52 received therein, parallel to the axes 34, 44 of the optical fibers 33, 52. Serving for checking the position of the optical fibers is the camera 23 (see FIG. 2), which transmits the image to the display 4 (likewise FIG. 2). Serving for supplying the appropriate high voltage to the electrodes 21 for the splicing operation is the high-voltage generator 6, which draws its energy from the battery unit 7.

Figure 4:
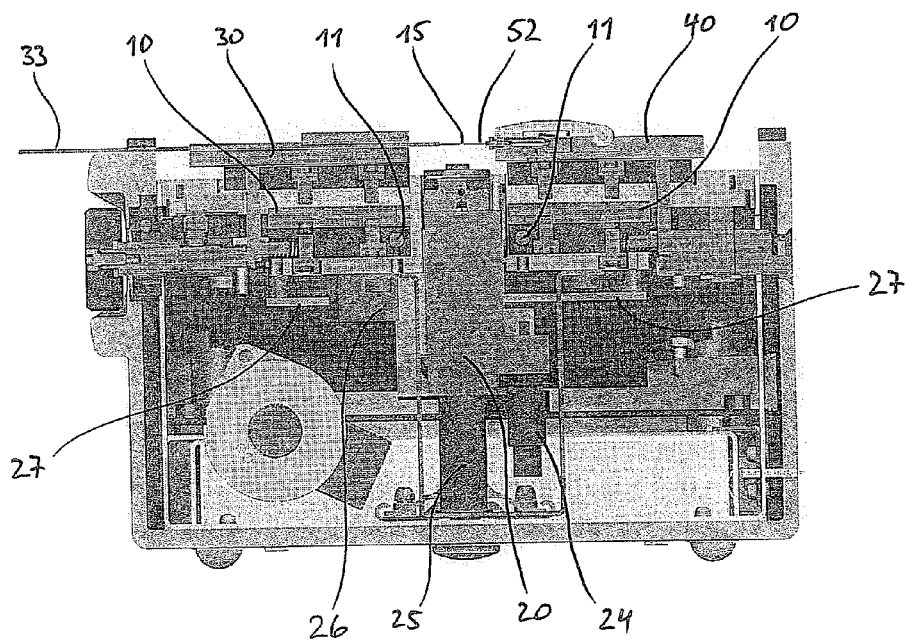
FIG. 4 shows the section according to FIG. 3, the device being shown in the releasing position.

In FIG. 4, the device 1 is shown in a way corresponding to FIG. 3, the splicing module 20 being in the releasing position and arrested by the arresting devices 25. The movement of the splicing module 20 from the splicing position into the releasing position is made possible by a linear guide 26 and is retarded by a shock absorber 24. In the exemplary embodiment shown, the splicing module 20 has been lowered. This lowering of the splicing module 20 also brings about a lowering of the side pins 27, which in turn are in operative connection with the carrier units 10. This allows the carrier units 10 to be brought from their tilted position back into the horizontal. Because the spindles 11 of the carrier units 10 lie lower than the optical fibers 33, 52 clamped in the holders 30, 40, said carrier units, and in particular also the spliced connection 15, are subjected to a presettable tensile loading. This tensile loading is chosen here such that the optical fibers 33, 52 and the spliced connection 15 are optimally tensioned for the subsequent application of a mechanical protection.

Figure 5:
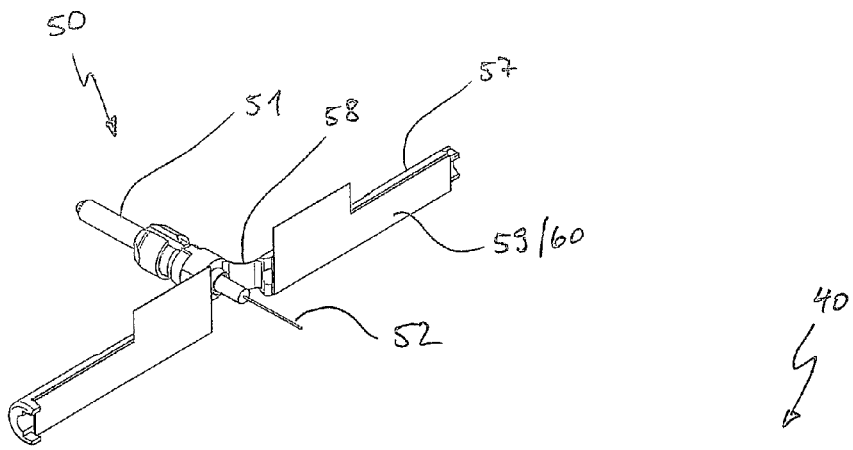
FIG. 5 shows a prefabricated optical fiber end piece before placement in a holder.

In FIG. 5, a prefabricated optical fiber end piece 50 is shown before placement in a holder 40 (see FIG. 6a). The end piece has a plug-in connector pin 51, in which an optical fiber 52 is cemented. The end piece 50 is provided with two sheath parts 57, which are each connected to the end piece 50 by means of a joint 58. The sheath parts 57 can be swung together, so that they enclose the optical fiber 52. The inner sides of the sheath parts 57 are each provided with an adhesive layer 59, which is covered by a protective film 60. The optical fiber 52 protrudes from the end piece 50 on the side opposite from the plug-in connector pin 51. In this case, this optical fiber 52 is dimensioned such that its end comes to lie approximately centrally between the sheath parts 57 when they are swung together.

Figure 6A:
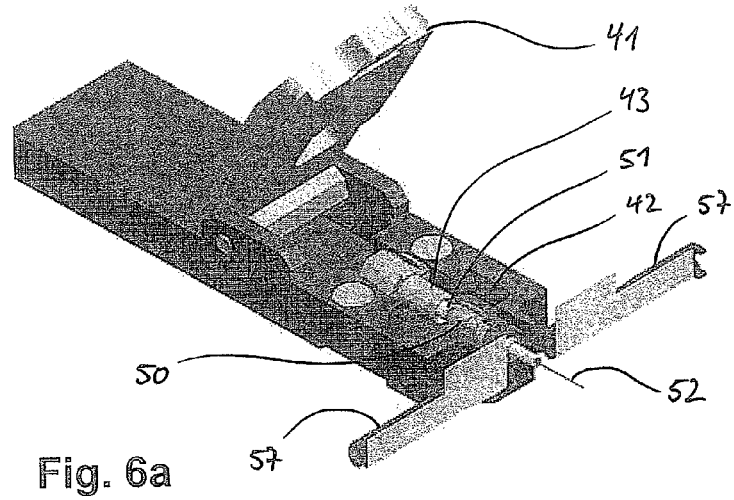
FIG. 6*a* shows a view of a holder for an end piece with an open closure flap.

FIG. 6a shows a holder 40 for receiving a prefabricated end piece 50 with an open closure flap 41. The holder 40 has a recess 42, which corresponds at least partially to the contours of the end piece 50. For precise guidance of the end piece 50, formed in the recess 42 is a connector pin receptacle 43, which receives the plug-in connector pin 51 of the end piece 50 and at the same time protects it from environmental influences. The prefabricated optical fiber 52 protrudes from the end piece 50 and also from the holder 40. The end piece 50 is only partially received by the holder 40. Along with the optical fiber 52, the two sheath parts 57 also protrude from the holder 40. In order to make the optical fiber 52 accessible for the splicing operation, the two sheath parts are connected to the end piece 50 by a joint. This makes it possible for the two optical fiber 52 to extend laterally away from the optical fiber 52 and, as shown, assume an angled-away position.

Figure 6B:
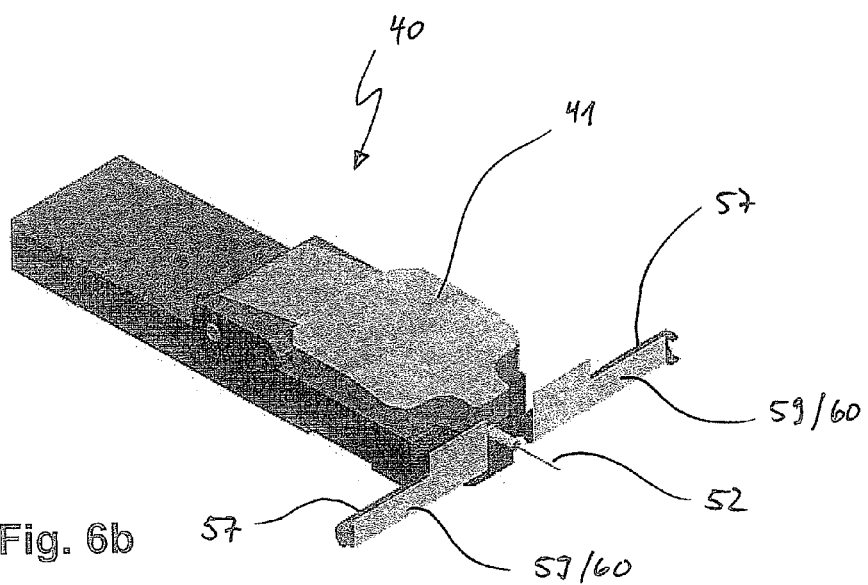
FIG. 6*b* shows a view of the holder according to FIG. 6*a*, the closure flap being closed.

FIG. 6b shows the holder 40 according to FIG. 6a, but with a closed closure flap 41. All that can be seen of the end piece are the two sheath parts 57, which allow the mechanical protection of the spliced connection after the splicing, and the optical fiber 52, which protrudes from the holder 40. The sheath parts 57 are provided with an adhesive layer 59, which is protected by a peel-off protective film 60.

Figure 7:
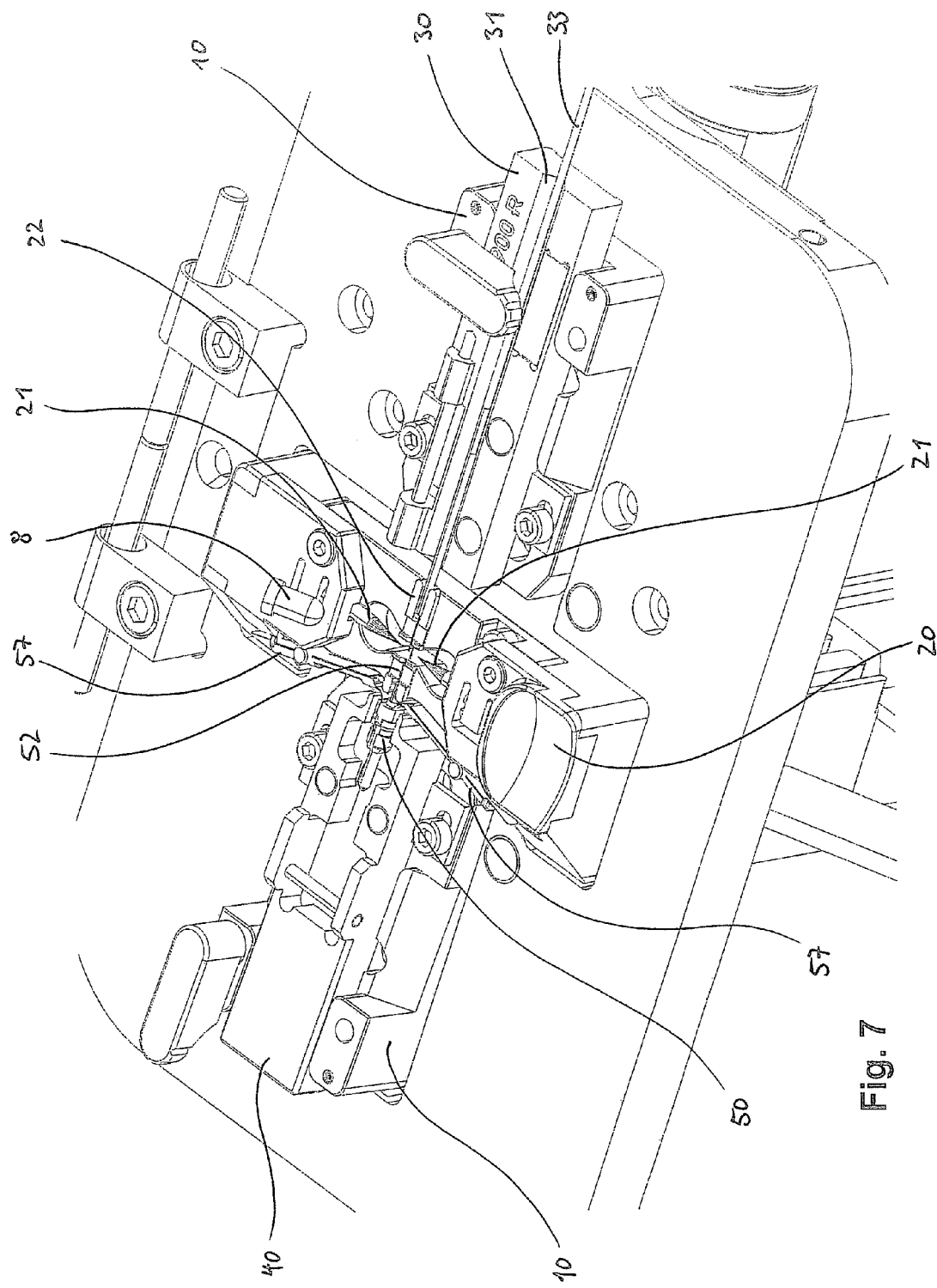
FIG. 7 shows an enlarged view of the device according to FIG. 1, the protective cover and the closure flaps of the holders having been removed.

In FIG. 7, an enlarged view of the working region of the device 1 according to FIG. 1 is shown. In this case, the protective cover and the two closure flaps of the holders 30, 40 have been removed. The splicing module 20 is in the splicing position. The two holders 30, 40 have each been placed on their carrier units 10. The planes of the two carrier units 10 have been tilted with respect to one another. An end piece 50 has been placed in the holder 40 and the two sheath parts 57 of the end piece 50 have been greatly angled away, so that the optical fiber 52 protrudes freely between the electrodes 21 of the splicing module 20. In the holder 30, an optical fiber 33 has been placed in a groove 31. The two optical fibers 52, 33 are aligned with one another in the region between the electrodes 21 by an aligning means 22 in the form of a V-shaped groove. An axial alignment takes place with the aid of the fine adjusting means 13, 13' (see FIG. 3). Serving for visually checking the alignment is the camera 23 (see FIG. 2), which shows the ends of the two optical fibers 52, 53 in magnified form on the display 4 (see FIG. 2). In order that the camera has sufficient light to detect the two optical fibers 33, 52, a light-emitting diode 8 is integrated as a lighting means in the protective cover 3 (see FIG. 2). This light-emitting diode 8 is shown floating freely, but in reality is integrated in the protective cover.

Figure 8:
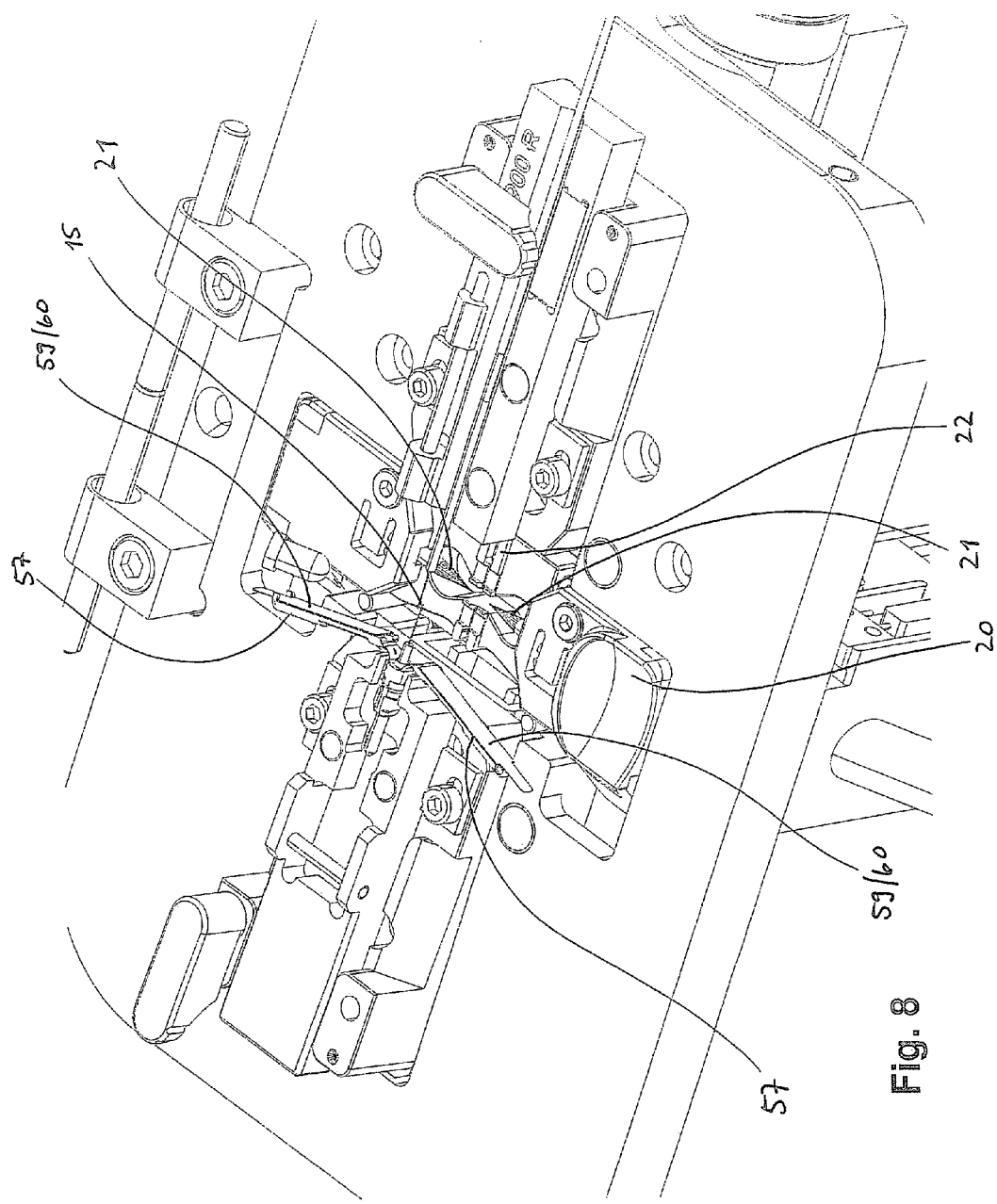
FIG. 8 shows the view according to FIG. 7, the device being in the releasing position.

FIG. 8 shows the view according to FIG. 7, the splicing module 20 being shown in the releasing position. The electrodes 21 and the aligning means 22 have been lowered with the splicing module 20. The spliced connection 15 has been released and the two sheath parts 57 are still angled away from the spliced connection 15. Peeling off the protective films 60 from the adhesive layers 59 of the sheath parts 57 exposes the adhesive layer 59, which adhesively bonds the two sheath parts 57 to one another and securely encloses the spliced connection when said sheath parts are swung together.

Figure 9:
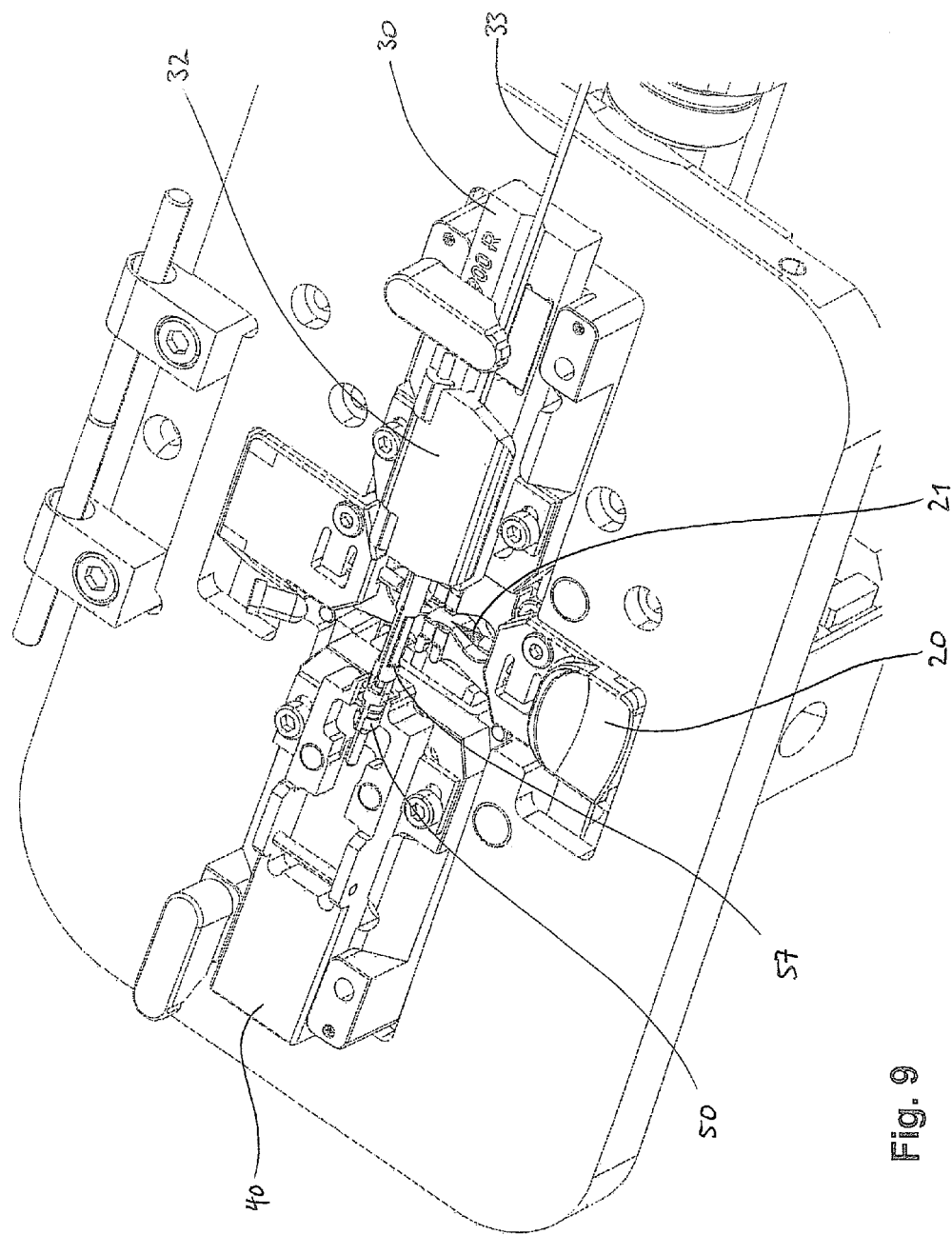
FIG. 9 shows the view according to FIG. 8, the sheath parts of the end piece having been closed around the splice.

FIG. 9 shows the view according to FIG. 8, but with the sheath parts 57 closed. The splicing module 20 with the electrodes 21 and the aligning means 22 is still lowered in the releasing position. The two sheath parts 57 of the end piece 50 have been swung together and adhesively bonded. They provide both mechanical protection and protection from athmospheric conditions and environmental influences, such as for example from moisture and dust. Opening the closure flap (not represented) of the holder 40 and the closure flap 32 of the holder 30 allows the ready-prefabricated end piece 50 with the spliced optical fibers to be removed. As this happens, the closed sheath parts 57 prevent the sensitive spliced connection from being damaged.

In FIG. 10, a further enlarged view of the working region of the device 1 according to FIG. 1 is shown. The fiber holding-down means 9, which is integrated in the protective cover 3 (see FIG. 2), is shown separately here. This fiber holding-down means 9 serves for fixing the two optical fibers 33, 52 in the aligning means 22 during the splicing. In this case, the fiber holding-down means 9 has contact elements in roller form, which are mounted in a floating manner and fix the optical fibers 33, 52 in the V-shaped groove of the aligning means 22 in the region of the ends of the optical fibers 33, 52.

The invention claimed is:

1. A device for splicing optical fibers, comprising:
   a first holder for directly or indirectly receiving a first optical fiber, said first holder being removably mounted on the device,
   a second holder for directly or indirectly receiving a second optical fiber, said second holder being removably mounted on the device,
   a splicing module positioned between the first holder and the second holder,
   an aligning means for aligning an end of the first optical fiber received in the first holder with an end of the second optical fiber received in the second holder, said aligning means being mounted on the splicing module, and
   at least one electrode mounted on the splicing module in a region of the mutually aligned ends of the first and second optical fibers to create the spliced connection,
   wherein the splicing module is vertically movable between a splicing position which facilitates the spliced connection and a releasing position that is a predetermined distance from a plane of the first and second holders,
   wherein the releasing position exposes the spliced connection for further processing, and
   wherein the first optical fiber and the second optical fiber respectively remain in the first holder and the second holder mounted on the device when the splicing module is in the releasing position.

2. The device as claimed in claim 1, wherein the at least two electrodes are movable together with the aligning means.

3. The device as claimed in claim 1, wherein the splicing module can be lowered.

4. The device as claimed in claim 1, wherein the splicing module can be moved away from the splicing position into the releasing position against a prestressing force and can be arrested in the releasing position.

5. The device as claimed in claim 4, wherein the splicing module can be arrested in the releasing position by an arresting device which releases the arrestment when there is pressure against the prestressing force.

6. The device as claimed in claim 1, wherein the first holder and the second holder are arranged on a carrier unit and releasably connected to the carrier unit.

7. The device as claimed in claim 6, wherein the carrier units lie on planes which can be tilted in relation to one another.

8. The device as claimed in claim 7, wherein the carrier units are mounted on a horizontal spindle perpendicular to the axes of the first and second optical fibers to be respectively received in the first and second holders.

9. The device as claimed in claim 7, wherein the carrier units are in operative connection with the movement mechanism to reach the releasing position in such a way that the carrier units tilt as they move from the releasing position into the splicing position.

10. The device as claimed in claim 1, wherein at least one of the two holders has a recess, in which an end piece which contains an optical fiber can be received with an exact fit.

11. A method for splicing optical fibers by a device for splicing, in particular according to claim 1, comprising the steps of:
    directly or indirectly mounting a first optical fiber into a first holder of the device,
    directly or indirectly mounting a second optical fiber into a second holder of the device,
    aligning an end of the first optical fiber with an end of the second optical fiber using an aligning means,
    producing an arc between at least two electrodes mounted on a splicing module, and obtaining a spliced connection by splicing together the ends of the optical fibers,
    moving the splicing module vertically to a releasing position that is a predetermined distance from a plane of the first and second holders in order to expose the spliced connection for further processing,
    applying a mechanical protection to the spliced connection,
    removing the first and second optical fibers from the first and second holders of the device, respectively,
    wherein, in the releasing position, the first optical fiber remains mounted in the first holder and the second optical fiber remains mounted in the second holder.

12. The method as claimed in claim 11, wherein the at least two electrodes are moved together with the aligning means.

13. The method as claimed in claim 11, wherein, after the splicing of the first and second optical fibers and before and during the application of the mechanical protection, the first and second optical fibers are subjected to a predefined tensile stress.

14. A method for use of an end piece, the end piece containing:
    an optical fiber which is prefabricated in the end piece and accessible on one side of the end piece, and
    sheath parts, which can be connected to the end piece or are connected by a joint comprising the steps of placing the end piece in a device as claimed in claim 1, and closing the sheath parts around the spliced connection and connecting the sheath parts to one another in the releasing position.

15. The device as claimed in claim 3, wherein the splicing module can be moved away from the splicing position into the releasing position against a prestressing force and can be arrested in the releasing position.

16. The device as claimed in claim 8, wherein the carrier units are in operative connection with the movement mechanism to reach the releasing position in such a way that the carrier units tilt as they move from the releasing position into the splicing position.

17. The device as claimed in claim 1, wherein in the releasing position, the spliced connection is released and freely accessible.

18. The device as claimed in claim 1, wherein in the releasing position, the spliced connection is accessible with respect to a longitudinal axis of the optical fibers over an angle of about 360°.

19. The device as claimed in claim 1, wherein in the releasing position, the first and second optical fibers are held by the holders.

20. The device as claimed in claim 3, wherein the splicing module can be lowered from the splicing position to the releasing position.

\* \* \* \* \*